United States Patent
Chiu et al.

(10) Patent No.: US 8,977,810 B2
(45) Date of Patent: Mar. 10, 2015

(54) SYSTEMS AND METHODS FOR USING MEMORY COMMANDS

(75) Inventors: Gordon Raymond Chiu, North York (CA); Teik Ming Goh, Jalan TasekTaman Anda (MY); Muhamad Aidil Jazmi, Melaka (MY); Yu Ying Ong, Ampang (MY)

(73) Assignee: Altera Corporation, San Jose, CA (US)

( * ) Notice: Subject to any disclaimer, the term of this patent is extended or adjusted under 35 U.S.C. 154(b) by 120 days.

(21) Appl. No.: 13/441,706

(22) Filed: Apr. 6, 2012

(65) Prior Publication Data

US 2012/0260032 A1    Oct. 11, 2012

Related U.S. Application Data

(60) Provisional application No. 61/473,671, filed on Apr. 8, 2011.

(51) Int. Cl.
  *G06F 12/00*    (2006.01)
  *G06F 13/16*    (2006.01)

(52) U.S. Cl.
  CPC .................................. *G06F 13/1626* (2013.01)
  USPC ............................ 711/105; 711/101; 711/154

(58) Field of Classification Search
  CPC ... G06F 9/3838; G06F 9/5066; G06F 3/0659; G06F 12/00
  USPC .......................................... 711/105, 101, 154
  See application file for complete search history.

(56) References Cited

U.S. PATENT DOCUMENTS

| | | | | |
|---|---|---|---|---|
| 6,065,105 | A * | 5/2000 | Zaidi et al. | 712/23 |
| 6,334,182 | B2 * | 12/2001 | Merchant et al. | 712/214 |
| 6,557,095 | B1 * | 4/2003 | Henstrom | 712/216 |
| 7,634,591 | B2 * | 12/2009 | Irish et al. | 710/18 |
| 8,347,309 | B2 * | 1/2013 | Smolens et al. | 718/108 |
| 2002/0046251 | A1 | 4/2002 | Siegel | |
| 2002/0062352 | A1 * | 5/2002 | Asano et al. | 709/212 |
| 2006/0004967 | A1 * | 1/2006 | Mithal et al. | 711/152 |
| 2007/0174493 | A1 * | 7/2007 | Irish et al. | 710/5 |
| 2009/0024833 | A1 | 1/2009 | Deneroff et al. | |
| 2009/0248972 | A1 | 10/2009 | Ware et al. | |
| 2010/0153636 | A1 * | 6/2010 | Huang et al. | 711/105 |

(Continued)

FOREIGN PATENT DOCUMENTS

| | | |
|---|---|---|
| EP | 1936630 | 6/2008 |
| KR | 10-2001-0034057 | 4/2001 |
| WO | 2013/106032 | 7/2013 |

OTHER PUBLICATIONS

WO patent application No. PCT/US2012/032602, International Search Report and Written Opinion mailed Aug. 21, 2013.

(Continued)

*Primary Examiner* — Jared Rutz
*Assistant Examiner* — Christopher Do
(74) *Attorney, Agent, or Firm* — Weaver Austin Villeneuve & Sampson LLP

(57) ABSTRACT

Systems and methods for using memory commands are described. The systems include a memory controller. The memory controller receives a plurality of user transactions. The memory controller converts each user transaction into one or more row and column memory commands. The memory controller reorders the memory commands associated with the plurality of user transactions before sending the memory commands to a memory device.

23 Claims, 8 Drawing Sheets

(56) References Cited

U.S. PATENT DOCUMENTS

| | | | |
|---|---|---|---|
| 2010/0293347 A1 | 11/2010 | Luttrell | |
| 2010/0332804 A1* | 12/2010 | Golla et al. | 712/214 |
| 2010/0332806 A1* | 12/2010 | Golla et al. | 712/216 |
| 2011/0055531 A1* | 3/2011 | Bellows et al. | 712/245 |
| 2011/0078697 A1* | 3/2011 | Smittle et al. | 718/104 |

OTHER PUBLICATIONS

Zhao Zhang, Zhichun Zhu, Xiaodong Zhang, "A Permutation-based Page Interleaving Scheme to Reduce Row-buffer Conflicts and Exploit Data Locality," micro, pp. 32, 33th Annual IEEE/ACM International Symposium on Microarchitecture (MICRO'00), 2000.

Stallings, William. Computer Organization and Architecture: Designing for Performance. 8th ed. Prentice Hall, 2010.

John L. Hennessy; David A. Patterson (2007). Computer Architecture: a quantitative approach (4th ed.). Morgan Kaufmann.

Synopsys. CoCentric™ SystemC Compiler Behavioral Modeling Guide,Version 2000.11-SCC1, Mar. 2001.

Johnson, Leith. Improving DDR SDRAM Efficiency with a Reordering Controller. Xcell journal, Issue 69, pp. 38-41, Fourth Quarter 2009.

Xcelljournal—Solutions for a Programmable World—FPGA's Power Net-Centric Battlefield on Many Fonts, Issue 69, Fourth Quarter 2009, 68 pages.

* cited by examiner

SYSTEMS AND METHODS FOR USING MEMORY COMMANDS

CROSS-REFERENCE TO RELATED APPLICATIONS

This patent application claims the benefit of and priority under 35 U.S.C. §119(e) to U.S. provisional patent application No. 61/473,671, filed on Apr. 8, 2011, and titled "SYSTEMS AND METHODS FOR USING MEMORY CONTROLLER COMMANDS", which is incorporated by reference herein in its entirety for all purposes.

FIELD OF THE INVENTION

The present disclosure generally relates to techniques and mechanisms for reordering memory commands in memory controllers.

BACKGROUND

Memory controllers may convert a series of local user transactions into row and column commands to be sent to a memory device. Reordering memory controllers change the order of these row and column commands in order to improve overall system efficiency and latency A major challenge in implementing a reordering controller is the need to determine which orderings of memory commands are possible for a given set of transactions. These orderings may be restricted due to: data hazards caused by reads or writes to the same subset of memory addresses; policies instrumented by a user regarding which re-order optimizations are permissible; and other dependencies caused by control commands (such as refresh) or complex commands (such as multicast commands), for example.

Conventional implementations of re-ordering controllers can require checking the above dependencies for each pair of commands in the controller, during each cycle of operation. Such conventional implementations can require significant surface area on a chip to implement, can scale with the square of the number of memory commands in the controller, and because of the relatively large amount of required computation can often be the timing critical path through the memory controller, thus decreasing the frequency at which a memory controller can operate.

An improved reordering memory controller that addresses the above challenges would be desirable.

SUMMARY OF THE INVENTION

Techniques and mechanisms for efficient implementation of a reordering memory controller are provided. Bit-vectors may be used to represent dependencies among a plurality of memory commands in a memory command pool. In some embodiments, logic circuitry of a memory controller may be configured to assign a user transaction to a user transaction pool slot in a memory command pool; calculate row and column command dependencies of the user transaction by determining one or more row or column memory commands associated therewith; and generate at least one bit-vector associated with the row and column command dependencies, wherein each bit vector corresponds to one of said one or more row and column memory commands, wherein said each bit vector comprises dependency information relating to dependencies between the one of said one or more row and column memory commands, and other memory commands in the memory command pool.

In other embodiments, dependencies of a plurality of memory commands are determined by a reordering memory controller. Two sets of bit vectors are generated to identify the dependencies, where a first set of bit vectors represents dependencies of row commands of the plurality of memory commands, and a second set of bit vectors represents dependencies of column commands of the plurality of memory commands.

BRIEF DESCRIPTION OF THE DRAWINGS

The systems and methods for using memory commands may best be understood by reference to the following description taken in conjunction with the accompanying drawings, which illustrate various embodiments of the present systems and methods.

DETAILED DESCRIPTION

Figure 1:
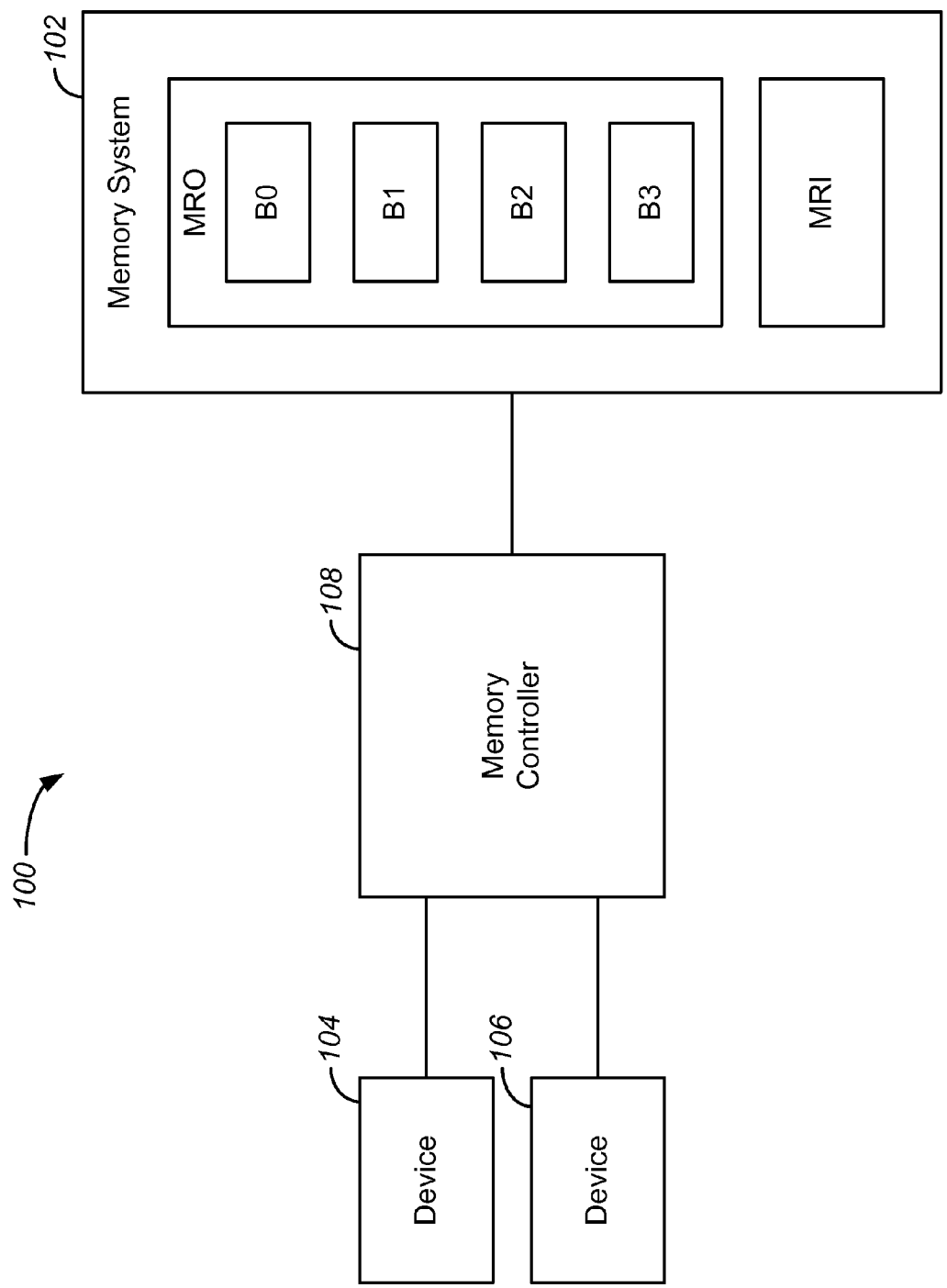
FIG. 1 is an exemplary block diagram of an embodiment of a system for writing to and reading from a memory system in accordance with one embodiment of the present invention.

Memory controllers may convert a series of local user transactions into row and column commands to be sent to a memory device. Memory controllers that perform reordering change the order of these row and column commands in order to improve overall system efficiency and latency.

User transactions—for example, reads or writes to specific addresses—may be converted into two kinds of memory interface commands (which are also referred to in this disclosure as memory commands): row commands which manage (open, close) a bank on the memory device; and column commands which execute a read or write to an open bank. The terms "row" and "column" commands are used because data cells are generally stored in a grid configuration, and therefore a data cell can be identified by a row and a column associated with the data cell. In some modern memory devices, a row command can be used to gain access to a group of cells associated with a particular row, and a column command can then be used to read or write data from a particular cell of that row. These commands can be interleaved on a single command bus connecting the memory controller to external memory, to ensure successful operation of the external memory, with strict timings (memory timings) that specify a minimum time required between commands.

Reordering memory commands can significantly improve efficiency of memory accesses and memory throughput by, for example, reducing the time required to perform bank management and effect bus turnarounds. Bus turnaround refers to steps that occur in transitioning between a read process and a write process on a data bus between a memory controller and a memory device. Bank management involves the mechanics of closing and opening rows of a memory device, each of which events can take multiple clock cycles to complete. Reordering involves choosing a sequence of memory commands that reduces bank management and bus turnaround overhead, while reducing row misses and bus turnarounds.

The trend for memory manufacturers over the decade has been to greatly increase the clock rate (and corresponding data rate) of memory devices. However, the memory timings have not scaled as dramatically and the overhead time required to manage a memory, for example, can remain large. The banked nature of some modern memory devices, DDR devices, for example, allows some memory management to be performed in parallel with data transfers. However, some overhead cannot be mitigated, and large memory management delays can greatly impact the achievable efficiency, or maximum throughput, of a memory device.

A major challenge in implementing a reordering controller can be the need to determine which reorderings of memory commands can be undertaken for a given set of transactions without inadvertently causing improper data values to be stored or read from memory. These reorderings may be restricted due to: data hazards caused by certain sequences of reads or writes to the same subset of memory addresses; policies implemented by the user regarding which re-order optimizations are permissible; and other dependencies caused by control commands (such as refresh) or complex commands (such as multicast commands).

Conventional implementations of reordering controllers can require checking for the above dependencies for each pair of commands in the controller, during each cycle of operation. Such a solution can require significant surface area on a chip to implement, can scale with the square of the number of memory commands in the controller, and because of the relatively large amount of computation required can often be the timing critical path through the controller, thus limiting the speed at which a memory controller can operate. The timing costs can be significant, as reordering often can be the timing-critical module in a memory controller system, and memory controllers must try to keep up with ever increasing high memory interface I/O speeds.

Techniques and mechanisms for implementing efficient reordering memory controllers are provided below.

Moreover, the techniques and mechanisms facilitate handling of one or more complex commands, one or more reordering policies, and/or one or more control commands in connection with dependency detection. A multicast command is an example of a complex command and a refresh command is an example of a control command. A multicast command is issued to write a same data to multiple memory ranks within one or more clock cycle. Each memory rank is a physical memory device. A refresh command is issued by a memory controller to restore a capacity of a memory cell within a memory rank to prevent data loss within the memory cell. One or more reordering policies may be set statically by a user at a time the user instantiates the memory controller in their design, or set dynamically by a user's logic during circuit operation such that the reordering policies can be different depending on a program state or task. Re-ordering policies may change order of issuance of two or more column commands from the memory controller.

Referring to FIG. 1, a system 100 for writing to and reading from a memory system 102 is described. System 100 includes multiple devices 104 and 106, a memory controller 108, and memory system 102. Each device 104 and 106 may be a controller or a processor. The controller may include a state machine. Moreover, memory system 102 may include more than one memory rank. For example memory system 102 may include a memory rank 0 (MR0) and an MR1. Each memory rank is a memory device, such as a DDR, a DDR2, or a DDR3, for instance. MR0 includes multiple memory banks B0, B1, B2, and B3. A memory bank is a logical unit within a memory rank. For example, memory addresses 0-64 of memory cells of MR0 are divided into four units B0, B1, B2, and B3. The memory bank B0 may have memory addresses 0-5, the memory bank B1 may have memory addresses 16-31, the memory bank B2 may have memory addresses 32-48, and the memory bank B3 may have memory addresses 49-64. It is noted that a memory address is an address of a memory cell within a row of a memory bank.

Device 104 and/or device 106 sends multiple user transactions UT0, UT1, UT2, and UT3 to memory controller 108. Memory controller 108 receives the user transactions and may convert each user transaction into one or more row or column commands. For example, a user transaction may be converted into one or more column commands, or it may be converted into a combination of a first row command (for example, an activate command), one or more read or write commands (that is, column commands), and a second row command (for example, a pre-charge command) based on a type of the user transaction. For example, when the user transaction is a read user transaction, memory controller 108 converts the user transaction into an activate command, a read command, and a pre-charge command. An activate command opens a row of the memory bank for performing a read or write to a memory address of the row, a pre-charge command closes the row for restricting a write of data to or read of data from memory addresses in the row, and the read command reads data from a memory cell of the row. As another example, when the user transaction is a write user transaction, memory controller 108 converts the user transaction into an activate command, a write command, and a pre-charge command. The write command writes data to a memory cell of a row. As yet another example, when the user transaction is the refresh command, memory controller 108 provides the refresh command to memory system 102. As another example, when the user transaction is the multicast command, memory controller 108 issues two activate commands simultaneously, two read or two write command simultaneously, and two pre-charge commands simultaneously to memory ranks MR0 and MR1. An activate command or a pre-charge command is an example of a row command. Moreover, a write command, a read command, or a refresh command is an example of a column command.

In various embodiments, system 100 includes any number of devices, such as devices 104 and 106, coupled with memory controller 108. Moreover, in some embodiments, memory system 102 includes any number of memory ranks and each memory rank includes a number of memory banks. In one embodiment, device 104 and/or device 106 sends any number of user transactions to memory controller 108.

Figure 2:
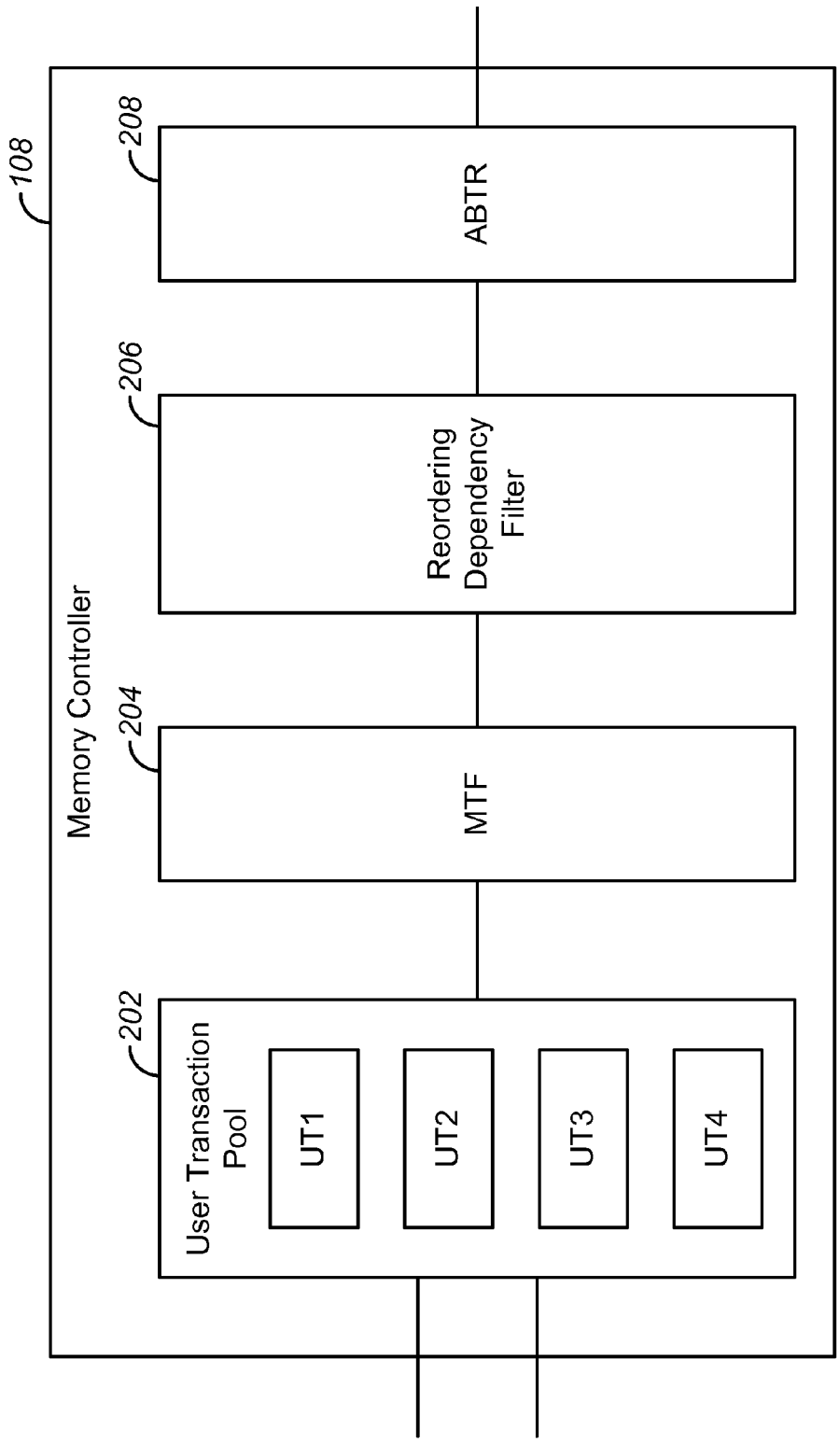
FIG. 2 is an exemplary block diagram of an embodiment of a memory controller of the system in accordance with one embodiment of the present invention.

Continuing with reference to FIG. 2, FIG. 2 provides one example of a memory controller architecture. Memory controller 108 includes a user transaction pool 202, a memory timing filter (MTF 204) 204, a Reordering Dependency Filter (RDF 206), and an arbiter 208. The user transaction pool 202 may be a queue or a buffer that stores the user transactions UT1, UT2, UT3, and UT4. Memory controller 108 receives user transactions and may convert each user transaction into one or more row or column commands. For example, depending on the type of user transaction, a user transaction may be converted into one or more column commands, or a user transaction may be converted into a combination of a first row command (for example, an activate command), one or more read or write commands (that is, column commands), and a second row command (for example, a pre-charge command). This conversion may be performed by the user transaction pool 202, the MTF 204 or another component of the memory controller 108.

MTF 204 determines which memory commands in a memory command pool are eligible to be issued during a particular clock cycle, based on timing constraints associated with the commands, and if there are any eligible memory commands issues the one or more memory commands to RDF 206 during that clock cycle. The RDF filter than reviews the memory commands eligible to be issued during that clock cycle and determines based on possible reorderings of the memory commands, which of the eligible memory commands would be most desirable to issue during that clock cycle. The arbiter 208 then decides from among the memory commands it receives from the RDF filter which ones to issue to the memory device.

Memory controller 108 applies one or more data restrictions, such as data hazards, one or more command restrictions imposed by special commands such as refresh, and/or one or more reordering policies to one or more memory commands to generate bit vectors, such as row bit vectors or column bit vectors, which are described below. The bit vectors may be generated when memory commands are received by a memory command pool, and the bit vectors may be updated when memory commands are flushed from the memory command pool. The memory command pool may be part of the user transaction pool 202, or it may be a separate component of the memory controller 108. Arbiter 208 issues one or more memory commands to memory system 102 based in part on the bit vectors.

Figure 3:
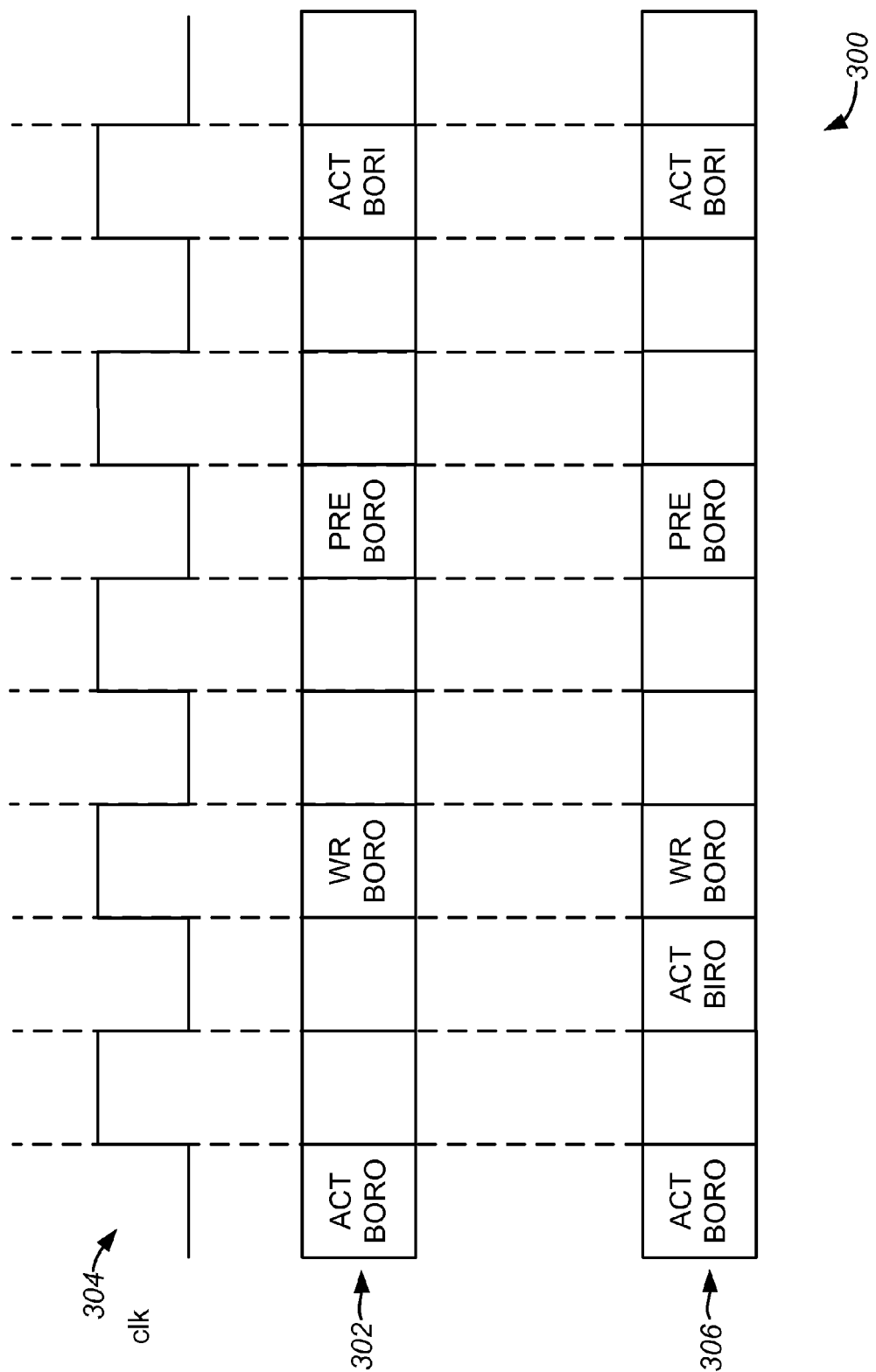
FIG. 3 is an exemplary timing diagram used to illustrate one or more command restrictions applied by the memory controller in accordance with one embodiment of the present invention.

With further reference to FIG. 3, a timing diagram 300 is used to illustrate the one or more command reorderings that may be applied by RDF 206.

A memory controller is able to perform two classes of reorder optimizations to improve efficiency and throughput: command and data-reordering. Command reordering, also known as bank-look-ahead or row command reordering, reorders the row commands issued by a memory controller to mitigate bus idle time. For example, a memory controller might reorder a row command to initiate the opening of a second row while a first row is still being accessed. As a result, the memory management required to open the second row might be completed by the time the memory controller is ready to access the second row.

FIG. 3 shows one example of a row command reordering that a memory controller can perform. Arbiter 208 issues a first sequence 302 of memory commands to memory system 102 synchronous with a clock signal 304. For example, arbiter 208 issues an activate command ACT B0R0 to a row R0 of the memory bank B0, issues a write command WR B0R0 to the row R0, issues a pre-charge command PRE B0R0 to the row R0, and issues an activate command ACT B0R1 to a row R1 of the bank B0. In the first sequence 302, there is no re-ordering performed by RDF 206 of the memory commands ACT B0R0, WR B0R0, PRE B0R0, and ACT B0R1. Moreover, in the first sequence 302, the write command WR B0R0 immediately follows the activate command ACT B0R0, the pre-charge command PRE B0R0 immediately follows the write command B0R0, and the activate command ACT B0R1 immediately follows the pre-charge command PRE B0R0. It is noted that a first memory command immediately follows a second memory command when there is no memory command between the first and second memory commands.

RDF 206 reorders the activate command ACT B1R0 to be between the activate command B0R0 and the write command WR B0R0. Any reordering performed by RDF 206 mitigates an amount of idle time of the data bus coupling memory controller 108 with memory system 102. Such mitigation helps improve the data rate between memory controller 108 with memory system 102.

Upon such reordering, arbiter 208 issues a second sequence 306 in which the activate command ACT B1R0 is located between the activate command ACT B0R0 and the write command WR B0R0. In the second sequence 306, the activate command B1R0 immediately follows the activate command B0R0, the write command WR B0R0 immediately follows the activate command ACT B1R0, the pre-charge command immediately follows the write command WR B0R0, and the activate command ACT B0R1 immediately follows the pre-charge command PRE B0R0.

The RDF 206 may restrict reordering of memory commands received from MTF 204 in accordance with the one or more command restrictions. For example, the RDF 206 may restrict placing a row command addressed to any row of a memory bank between a row command addressed to a particular row of the memory bank and a column command addressed to the same particular row. In this example, the row command addressed to the particular row may be an activate command and the column command may be a read or a write command. Moreover, in this example, the row command addressed to any row immediately follows the row command addressed to the particular row and the column command addressed to the particular row immediately follows the row command addressed to any row. A violation of the one or more command restrictions may interfere with a read or write to be performed to a row of a memory bank. For example, when a pre-charge command to a second row of the memory bank is reordered between an activate command to the first row of the memory bank and a column command to the first row, the column command cannot be applied to the first row. In this example, the pre-charge command immediately follows the activate command and the column command immediately follows the pre-charge command. In this example, according to the one or more command restrictions, the column command to the first row is to be applied between the activate command to the first row and the pre-charge command to the first row so that the column command immediately follows the activate command and the pre-charge command immediately follows the column command.

Figure 4:
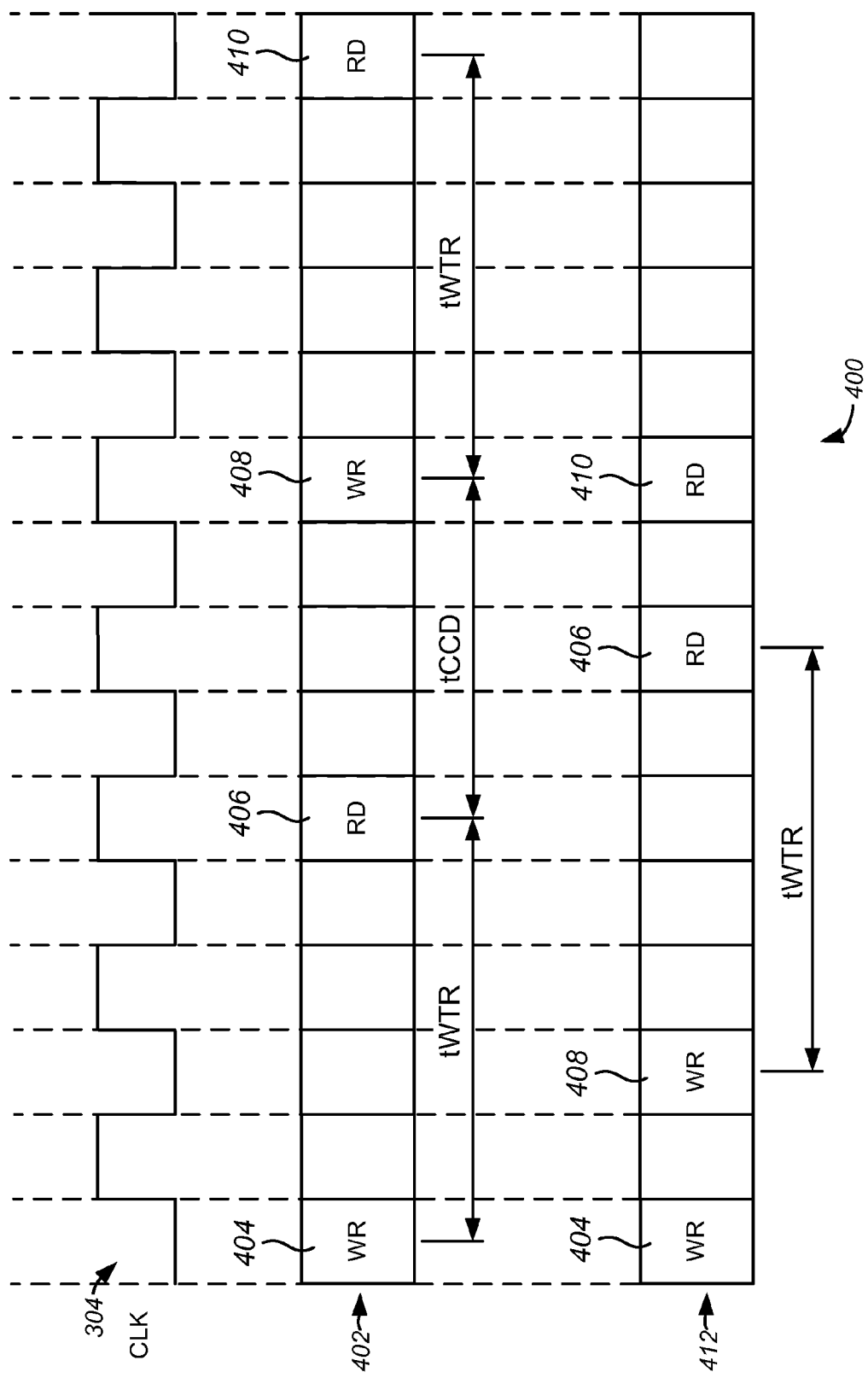
FIG. 4 is an exemplary timing diagram illustrating one or more data restrictions applied by the memory controller in accordance with one embodiment of the present invention.

Referring to FIG. 4, a timing diagram 400 is used to illustrate the one or more reordering of column commands that may be applied by the RDF 206.

With column command reordering, which is also commonly referred to as data-reordering, column commands can be reordered such that the data transactions on the memory bus are performed out-of-order. This can greatly improve efficiency by grouping together accesses to the same row, preventing unnecessary bank opening and closing, or by grouping together reads and writes to prevent unnecessary bus turnaround. This can be seen in FIG. 4. However, in addition to the added cost of a data reorder buffer, data reordering can also introduce the need for costly hazard analysis and detection.

As shown in FIG. 4's depiction of column command reordering, arbiter 208 issues a third sequence 402 of memory commands to memory system 102 synchronous with clock signal 304. For example, arbiter 208 issues a write command WR 404 to a memory address within a row, issues a read command RD 406 to the memory address, another write command WR 408 to the memory address, and another read command RD 410 to the memory address. In the third sequence 402, the read command RD 406 immediately follows the write command WR 404, the write command WR 408 immediately follows the read command RD 406, and the read command RD 410 immediately follows the write command WR 408. In the third sequence 402, there is no reordering performed by RDF 206 of the memory commands WR 404, RD 406, WR 408, and RD 410 received from MTF 204. Note that tWTR in FIG. 4 refers to a delay that may need to be observed before a read operation may be performed at a same data address that a write operation has been performed.

To comply with a data restriction, the RDF 206 restricts from reordering a write command to a memory address immediately following a read command to the memory address into the read command immediately following the write command. For example, RDF 206 restricts from reordering write command WR 408 between the write command WR 404 and the read command RD 406 to comply with a data restriction. (Such a hypothetical reordering is shown in sequence 412). Moreover, to comply with another data restriction, RDF 206 restricts from reordering a first write command to a memory address immediately following a second write command to the memory address into the second write command immediately following the first write command. Furthermore, to comply with yet another data restriction, RDF 206 restricts from reordering a read command to a memory address immediately following a write command to the memory address into the write command immediately following the read command. RDF 206 receives a memory address to which a memory command is directed from the memory command.

A reordering from a read command to a memory address immediately following a write command to the memory address, into the write command immediately following the read command may result in incorrect data being read from the memory address. Moreover, a reordering from a write command to a memory address immediately following a read command to the memory address, into the read command immediately following the write command may result in incorrect data being read from the memory address. (This situation is shown in the change from sequence 402 to sequence 412). Also, a reordering from a first write command to a memory address immediately following a second write command to the memory address into the second write command immediately following the first write command may result in incorrect data being written to the memory address.

Data hazards can occur when instructions with data dependency modify data in different stages of a pipeline. A data hazard can occur in three situations: a read-after-write (RAW), a write-after-read (WAR), and a write-after-write (WAW) to the same memory address. In order to ensure consistency of the contents of the memory device, a memory controller must detect data dependencies and only perform reordering that does not produce data hazards.

In addition to dependencies caused by data hazards, further dependencies can exist between local commands. One example is the periodic maintenance operation refresh, which restores the capacitive memory cells to prevent data loss; commands cannot be reordered past the refresh command. Other commands such as multicast, which broadcast to a large number of ranks simultaneously, create complex data dependencies. Finally, a user may dynamically adjust reordering policy to temporarily disable command and/or data-reordering, which produces additional, artificial dependencies.

In order to efficiently (both in terms of area and timing) implement command- and data-reordering in a controller; a simple model for representing these dependencies may be useful. By simplifying the representation of dependencies, evaluation of these dependencies to find commands eligible for execution can be greatly simplified and performed more quickly. Various embodiments provide a dependency graph that may be used by a memory controller to model the different row and command dependencies among a group of memory commands, and then serve as the basis for analysis to make simplifications to the model.

Figure 5:
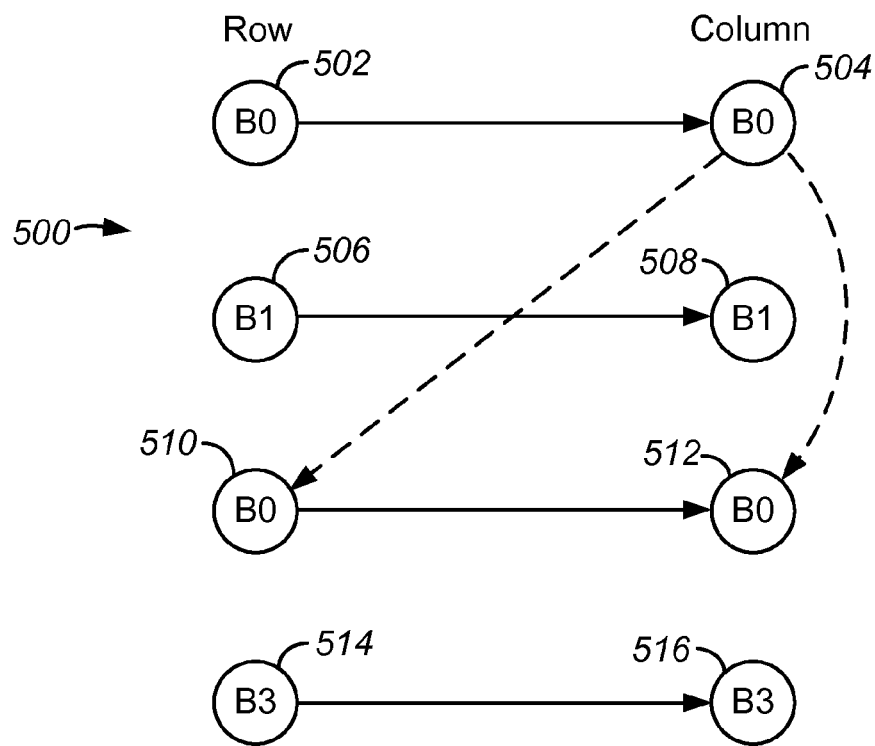
FIG. 5 is an exemplary reordering dependency graph illustrating dependencies generated by the memory controller based on a data restriction and a command restriction in accordance with one embodiment of the present invention.

FIG. 5 shows a dependency graph 500 for a series of four local user transactions issued to a memory controller, with the target bank of each command indicated. The four user transactions are shown in the order they were received by the memory controller. It is appreciated that showing four user transactions is exemplary and not intended to limit the scope of the present invention. For example, five user transactions or any number of user transactions may be implemented.

Each local user transaction is modeled as two nodes within the graph: the first node for the row or bank management command and the second node for the column or data command, if necessary. It is appreciated that an implicit dependency always exists from the row to the column command for the same local command—that is, the row must be managed or activated prior to data transfer.

Explicit data dependencies can be modeled directly upon this graph structure. Dependencies caused by command re-ordering, which prevent a row command from being reordered earlier than another local column command to the same bank, can be modeled directly on the graph and are represented by the arrows going from the row node to the column node relating to the same local user transaction. Data reordering (that is, column) dependencies can similarly prevent both row and column commands from being reordered earlier than other column commands to the same bank. FIG. 5 depicts such dependencies with an arrow drawn from a command to a subsequent command (which depends on the first command completing first).

With further reference to FIG. 5, according to the reordering dependency graph 500, a first local user transaction associated with a row command 502 addressed to the memory bank B0 and column command 504 addressed to the memory bank B0 is received by the memory controller. Reception by the memory controller of a second local user transaction associated with row command 506 addressed to the memory bank B1 and column command 508 addressed to the memory bank B1 follows. Subsequently, the memory controller receives a third local user transaction associated with a row command 510 addressed to the memory bank B0 and a column command 512 addressed to the memory bank B0.

Finally, the memory controller receives a row command 514 addressed to the memory bank B3 and a column command 516 address to the memory bank B3.

As shown by dashed lines, RDF 206 applies the one or more command restrictions to determine that the row command 510 depends on the column command 504 and applies the one or more data restrictions to determine that the column command 512 depends on the column command 504. The RDF 206 restricts the row command 510 from being issued before the column command 504 and restricts the column command 512 from being issued before the column command 504. Based on reordering restrictions illustrated in the reordering dependency graph 500, arbiter 208 does not issue the row command 510 before issuing the column command 504 and does not issue the column command 512 before issuing the column command 504.

It is noted that in various embodiments, dependencies may be created for any number of memory commands.

Figure 6:
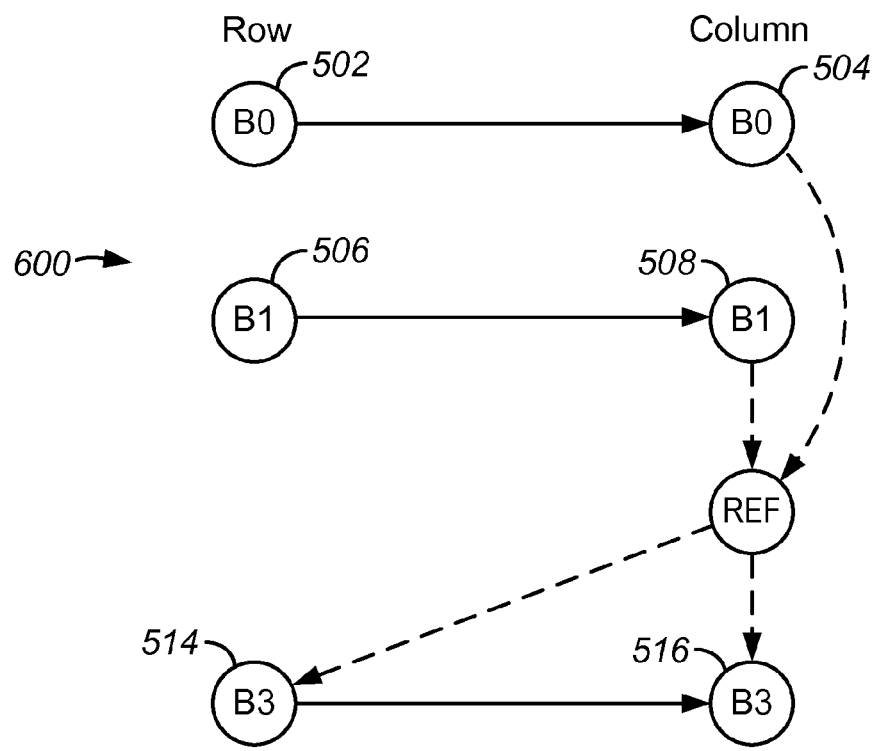
FIG. 6 is an exemplary reordering dependency graph illustrating dependencies generated by the memory controller based on one or more control commands in accordance with one embodiment of the present invention.

Referring to FIG. 6, as shown in a reordering dependency graph 600, a refresh command is received by a memory controller after the reception of a local user transaction associated with row command 506 and column command 508, but before the reception of a local user transaction associated with row command 514 and column command 516. As shown by dashed lines, RDF 206 applies the one or more command restrictions to determine that the row command 514 depends on the refresh command REF and applies the one or more data restrictions to determine that the refresh command REF depends on the column commands 504 and 508. The RDF 206 restricts the row command 514 from being issued before the refresh command REF and the refresh command REF from being issued before the column commands 504 and 508. Based on the restrictions in reordering illustrated by the reordering dependency graph 600, arbiter 208 does not issue to memory system 102 the row command 514 before issuing the refresh command REF and does not issue the refresh command REF before issuing the column commands 504 and 508.

RDF 206 applies the one or more data restrictions to determine that the column command 516 depends on the refresh command REF. The RDF 206 restricts the column command 516 from being issued before the refresh command REF. Based on the restrictions in reordering illustrated by the reordering dependency graph 600, arbiter 208 does not issue to memory system 102 the column command 516 before issuing the refresh command REF.

Figure 7:
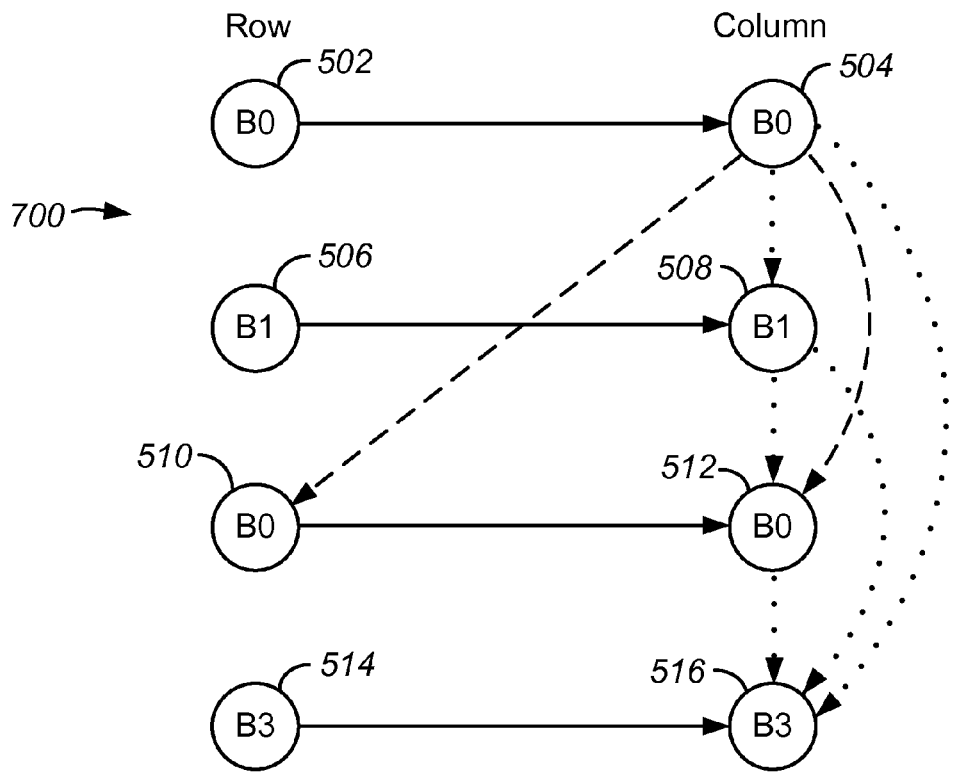
FIG. 7 is an exemplary reordering dependency graph illustrating dependencies generated by the memory controller based on one or more reordering policies in accordance with one embodiment of the present invention.

With further reference to FIG. 7, a reordering dependency graph 700 is used to illustrate dependencies generated by RDF 206 based on one or more reordering policies applied by a user. The row command 502, the column command 504, and the row command RC0 (not shown) are generated from the user transaction UT0. Moreover, the row command 506, the column command 508, and the row command RC1 (not shown) are generated from the user transaction UT1. Also, the row command 510, the column command 512, and the row command RC2 are generated from the user transaction UT2. Additionally, the row command 514, and the column command 516 are generated from the user transaction UT3.

One or more reordering policies may be set statically by a user at a time the user instantiates the memory controller in their design, or set dynamically by a user's logic during circuit operation such that the reordering policies can be adjusted depending on a program state or task. RDF 206 applies the one or more reordering policies. In the example shown, the reorder policy modification instituted by the user is data re-order disabling. The RDF 206 applies this user reordering policy and determines that to implement this policy the column command 508 depends on the column command 504, the column command 512 depends on the column command 508, the column command 516 depends on the column command 512, the column command 516 depends on the column command 508, and the column command 516 depends on the column command 504. Moreover, based on restrictions in reordering shown in the reordering dependency graph 700, arbiter 208 does not issue to memory system 102 the column command 508 before the column command 504, the column command 512 before the column command 508, the column command 516 before the column command 512, the column command 516 before the column command 508, and the column command 516 before the column command 504.

Analysis of dependency graphs results in three simplifying realizations that can be used in creating an implementation of a reordering dependency filter:

1. Other than the inherent dependencies between row and column commands of the same local command, the source of all dependencies is always a column command.
2. Row and column commands can be independently considered when determining which commands are eligible for issue. The notion of "local command" is no longer required.
3. Dependencies are only gained when a command first appears in the system, and commands cannot "collect" new dependencies during the course of execution.

These three realizations when used in analyzing dependencies among a group of memory commands can lead to optimizations in representation and calculation that reduce the complexity of implementations and contribute to the efficiency of data dependency check implementations within a memory controller.

Figure 8:
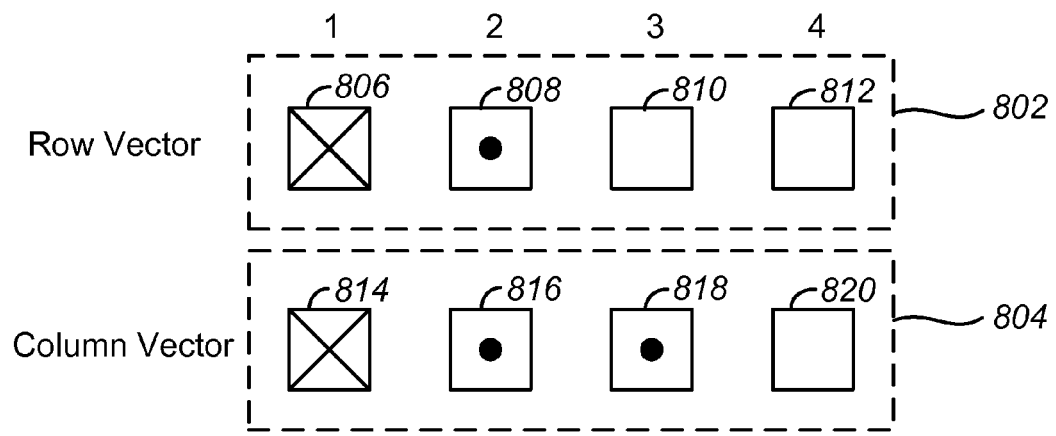
FIG. 8 shows an exemplary embodiment of a row dependency vector and a column dependency vector in accordance with one embodiment of the present invention.

As noted above with reference to FIG. 2, a memory controller may include a reordering dependency filter (RDF) as part of its architecture. FIG. 8 shows one implementation of a RDF. This implementation introduces a concept of a dependency vector and can use the conclusions drawn from analysis of dependency graphs described above, for example, to reduce the complexity of the implementation.

Referring now to FIG. 8, FIG. 8 shows an example of two dependency vectors, the first dependency vector 802 associated with a row command, and the second dependency vector 804 associated with a column command. Each dependency vector may record with a set of bits which column commands are required to be issued prior to the command associated with the dependency vector.

In FIG. 8, each of a row dependency vector 802 and a column dependency vector 804 is a bit vector that includes one or more bits.

As noted above, a user transaction may be converted into one or more row or column commands, and be assigned to a slot in a memory command pool. Each row or column command may be assigned a bit vector. In some embodiments, each bit vector may contain as many bit positions as there are pool slots in the memory command pool. Each bit position may then refer to a memory command stored in the corresponding pool slot. For example, row dependency vector 802 may correspond to a memory command stored at a first pool slot in a memory command pool.

In FIG. 8, row dependency vector 802 includes bit positions 806, 808, 810, and 812, and column dependency vector 804 includes bit positions 814, 816, 818, and 820. The dependency vector records with a set of bits, for both row and column commands, which column commands must be issued prior to it. For example, bit position 806 includes a bit that indicates whether a row command 1 corresponding to row vector 802 depends on a column command 1, bit position 808 includes a bit that indicates whether the row command 1 depends on a column command 2, bit position 810 includes a bit that indicates whether the row command 1 depends on a column command 3, and bit position 812 includes a bit that indicates whether the row command 1 depends on a column command 4. Moreover, bit position 814 includes a bit that indicates whether the column command 1 depends on the column command 1, bit position 816 includes a bit that indicates whether the column command 1 depends on the column command 2, bit position 818 includes a bit that indicates whether the column command 1 depends on the column command 3, and bit position 820 includes a bit that indicates whether the column command 1 depends on the column command 4.

It is noted that in some embodiments the column command 1 is received by RDF 206 immediately following the reception of the row command 1, the row command RC0 is received by RDF 206 immediately following the reception of the column command 1, the row command 2 is received by RDF 206 immediately following the reception of the row command RC0. Moreover, the column command 2 is received by RDF 206 immediately following the reception of the row command 2, the row command RC1 is received by RDF 206 immediately following the reception of the column command 2, and the row command 3 is received by RDF 206 immediately following the reception of the row command RC1. Also, the column command 3 is received by RDF 206 immediately following the reception of the row command 3, the row command RC2 is received by RDF 206 immediately following the reception of the column command 3, and the row command 4 is received by RDF 206 immediately following the reception of the row command RC2. Moreover, the column command 4 is received by RDF 206 immediately following the reception of the row command 4.

In other embodiments, the memory command pool slots assigned to memory commands may not reflect the order in which the memory commands were received by the memory command pool but rather availability of pool slots when each memory command was received at the memory command pool.

The RDF 206 may generate row dependency vector 802 to indicate to arbiter 208 one or more dependencies of a row command on one or more column commands. For example, as noted above, a bit at bit position 808 indicates that the row command 1 depends on the column command 2, a bit at bit position 810 indicates that the row command 1 does not depend on the column command 3, and a bit at bit position 812 indicates that the row command 1 does not depend on the column command 4. Based on the bits at bit positions 808, 810, and 812, arbiter 208 does not issue the row command 1 before issuing the column command 2, may issue the row command 1 before issuing the column command 3, and may issue the row command 1 before issuing the column command 4.

In some embodiments, the first position 806 of bit vector 802 may be assigned an X because it represents self-dependency from command 1 to itself and thus is not applicable. The other bit positions (808, 810 and 812) in bit vector 802 may be used to indicate whether the memory command stored at the first pool slot is dependent on the memory commands, if any, stored in respectively, the second, third and fourth pool slots of a memory command pool.

Moreover, the RDF 206 may generate the column dependency vector 804 to indicate to arbiter 208 one or more dependencies of a column command on one or more column commands. For example, a bit at bit position 816 indicates that the column command 1 depends on the column command 2, a bit at bit position 818 indicates that the column command 1 depends on the column command 3, and a bit at bit position 820 indicates that the column command 1 does not depend on the column command 4. Based on the bits at bit positions 816, 818, and 820, the arbiter 208 does not issue the column command 1 before issuing the column commands 2 and 3, and may issue the column command 1 before issuing the column command 4.

It is noted that bit positions 806 and 814 marked with an 'X' indicate self-dependency. For example, the 'X' at bit position 806 indicates that the row command 1 depends on itself and the 'X' at bit position 814 indicates that the column command 1 depends on itself. The 'X's represent non-applicability of values of bits to bit positions 806 and 814.

It is also noted that a bit position is within a memory element, such as a register or a memory cell, of RDF 206. It is also noted that although four bit positions are shown in each of row dependency vector 802 and column dependency vector 804, the number of bit positions within a bit vector may vary according to a number of column commands.

It is noted that in various embodiments, the one or more reordering policies may be to disable or enable for a time period the application of the one or more data restrictions and/or the one or more command restrictions. The time period is provided by the user to the processor of the computer via the input device.

Moreover, it is noted that in some embodiments, registers including the positions of row vector 802 of a row command are located adjacent to registers that store a bank address, row address, data, and/or status related to the row command. The rank address is an address of a memory rank and the bank address is an address of a memory bank having a row that may be opened or closed using the row command. The status may be whether the row of the memory bank is opened or closed.

It is further noted that in one embodiment, registers including the positions of column vector 804 of a column command are located adjacent to registers that store a memory address, data, and/or status related to the column command. The memory address is an address within a row to which the data is written to or read from using the column command. The status may be whether the data has been written to or read from a memory cell having the memory address.

Figure 9:
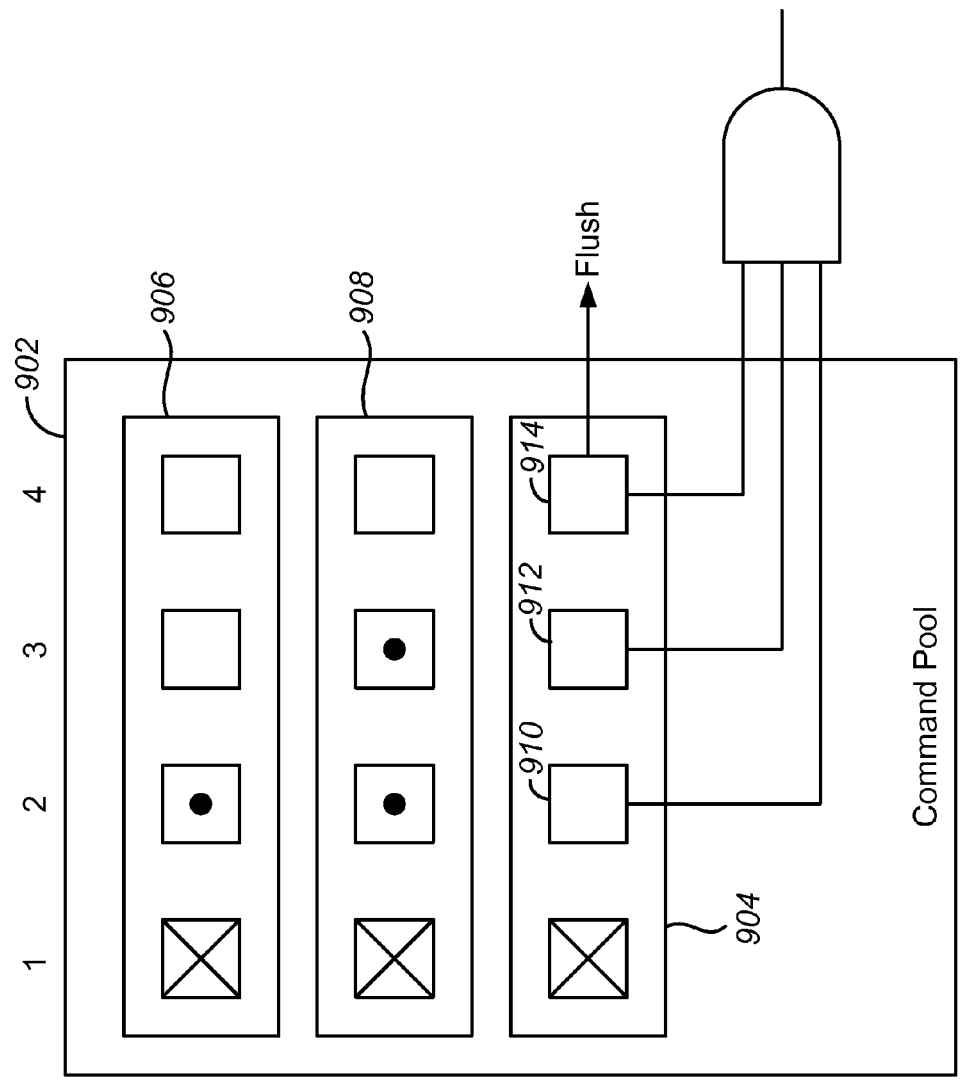
FIG. 9 is an exemplary block diagram illustrating a memory command pool of the memory controller in accordance with one embodiment of the present invention.
Figure 9:
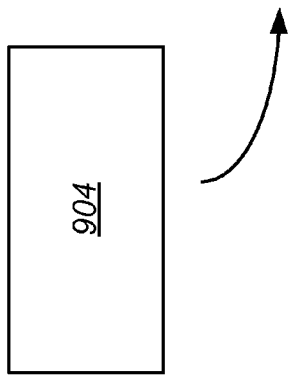

With reference to FIG. 9, a command pool 902 may be a buffer or a queue. For example, command pool 902 includes multiple registers. RDF 206 receives a memory command 904 and determines dependencies of the memory command 904 on memory commands 906 and 908 in the command pool 902. Moreover, RDF 206 determines dependency of memory commands 906 and 908 on memory command 904. For example, if memory command 904 is a row command, RDF 206 compares a rank address of the memory command 904 with the rank addresses of the memory commands 906 and 908, and compares a bank address of the memory command 904 with bank addresses of the memory commands 906 and 908 to determine whether the memory command 904 depends on the memory commands 906 and 908 and also to determine whether the memory commands 906 and 908 depend on the memory command 904. A memory command with a rank address does not depend on another memory command with a different rank address. As another example, if memory command 904 is a column command, the RDF 206 compares a memory address of the memory command 904 with memory addresses of the memory commands 906 and 908 to determine dependencies of the memory command 904 on the memory commands 906 and 908 and to determine dependencies of the memory commands 906 and 908 on the memory command 904.

Upon determining the dependencies, RDF 206 loads memory command 904 from a command queue (not shown) into the command pool 902. The command queue may be within or outside the RDF 206. The RDF 206 may load memory command 904 into a slot of the command pool 902 based on availability of the slot. For example, if a slot within command pool 902 is empty and thus available to accommodate the memory command 904, the memory command 904 may be loaded into the slot. As another example, if none of multiple slots within the command pool 902 is available, the RDF 206 waits to load the memory command 904 into the command pool 902.

Commands may be loaded into the pool into any free slot, rather than being assigned a pool slot using an identifier or using a numbering system. That is, memory command 904 may not be required to go to command pool slot 902 as a result of any address or attribute of memory command 904. The loading of memory controller 108 in an available slot improves efficiency of RDF 206 compared to using the identifier or number to assign pool slots. A slot may include a number of memory elements.

When a memory command is loaded into the command pool 902, the memory command is associated with a bit vector that shows dependencies of the memory command on other memory commands in the command pool 902. For example, memory command 906 is associated with row vector 802 and memory command 908 is associated with column vector 804.

For each memory command 904, 906, and 908 loaded in the command pool 902, RDF 206 determines whether the memory command depends on the existing memory commands in the memory command pool 902. For example, an AND gate is coupled with bit positions 910, 912, and 914 of a bit vector of memory command 904. The AND gate outputs an asserted value and if all bit positions 910, 912, and 914 have asserted values. The asserted values of bit positions 910, 912, and 914 indicate that memory command 904 does not depend on memory commands 906 and 908. The asserted value output by the AND gate indicates an existence of a flush signal.

On the other hand, if any or all values at bit positions 910, 912, and 914 is non-asserted, an output of the AND gate is non-asserted and the non-assertion indicates a lack of the flush signal. It is noted that an input of the AND gate is not coupled with a bit position that indicates a dependency of a memory command on the memory command itself. The AND gate does not contribute or minimally contributes to a critical path.

Upon determining that the memory command 904 does not depend on the remaining memory commands 906 and 908, the RDF 206 signals to arbiter 208 the lack of the dependencies by sending the flush signal to the arbiter 208 and flushes, such as deletes, the memory command 904 from command pool 902. Upon receiving the flush signal, the arbiter 208 issues the memory command 904 to the memory system 102.

Upon flushing of memory command 904 from command pool 902, the RDF 206 removes dependencies of the remaining memory commands 906 and 908 on the memory command 904. Once the memory command 904 is flushed, the dependency between the memory command 904 and other memory commands 906 and 908 in the command pool 902 cannot change. Moreover, the memory command 904 occupies a same slot in the command pool 902 between a time of loading the memory command 904 in the command pool 902 and a time of flushing the memory command 904 from the command pool 902.

In various embodiments, it is noted that the identifier and/or number may be used to associate memory command 904 with a slot of the command pool 902. In some embodiments, RDF 206 determines the dependencies between the memory command 904 and the remaining memory commands 906 and 908 only once during the time period between issuance of memory command 904 from the command queue and loading of the memory command 904 in the command pool 902. This one time determination helps improve efficiency of RDF 206 compared to determining dependencies between the memory command 904 and the remaining memory commands 906 and 908 for multiple times during a time period from the loading of the memory command 904 into command pool 902 to retirement of a user transaction from which the memory command 904 is generated. The user transaction may be retired by memory controller by memory controller 108 from the memory controller 108 after a read or write indicated in the user transaction is completed.

In some embodiments, any other type of gate, such as, an OR gate, a NOR gate, or a NAND gate, can be used instead of the AND gate.

Moreover, in one embodiment, the memory command 904 is flushed from the command pool 902 upon issuance of the memory command 904 from the arbiter 208. In some embodiments, the RDF 206 removes the dependency of the memory commands 906 and 908 on the memory command 904 upon issuance of the memory command 904 by the arbiter 208 from the memory controller 108 to memory system 102. That is, dependency bits may be removed when the corresponding memory command is retired from the system. Bitwise operations may be used to update the vectors on command flush, for example, to remove bits that correspond to retired commands.

It is further noted that in various embodiments RDF 206 may be disabled. In such embodiments, RDF 206 does not reorder memory commands received from MTF 204. Rather, arbiter 208 issues memory commands in the same order in which the memory commands are received from MTF 204 by RDF 206.

Figure 10:
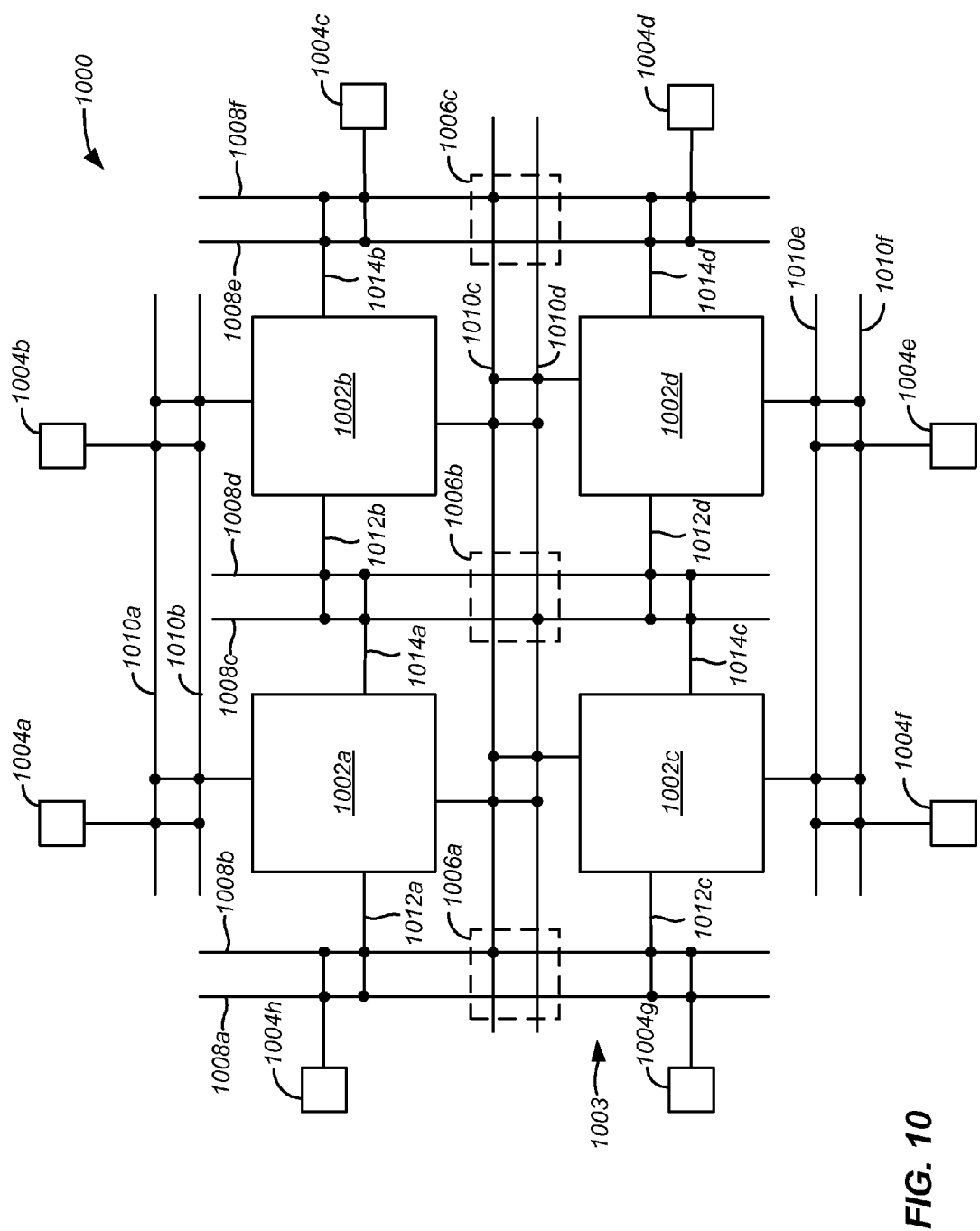
FIG. 10 is an exemplary block diagram of an integrated circuit (IC) chip in which the memory controller may be implemented in accordance with one embodiment of the present invention.

Referring to FIG. 10, an IC chip 1000 including a PLD is described. The PLD may be an FPGA. The IC chip 1000 may include multiple logic array blocks 1002 (LABs), a routing architecture 1003, and multiple input/output (IO) pads 1004. It is also noted that LAB 1002a, 1002b, 1002c, or 1002d may include one or more logic elements (LEs). Each LE includes one or more components, such as multiplexers, registers, logic gates, and adders.

Routing architecture 1003 may include multiple switches 1006. LABs 1002 may be coupled with each other via routing architecture 1003. Routing architecture 1003 may include multiple vertical LAB lines 1008 and multiple horizontal LAB lines 1010. LAB 1001 may have one or more LAB inputs 1012 and one or more LAB outputs 1014.

IO pad 1004 may include one or more buffers. IO pads 1004 may be coupled with routing architecture 1002. Switch 1006a, 1006b, or 1006c may be configured by using a configuration bit stored within a memory cell coupled with the switch.

LAB 1002d may receive, via LAB input 1012d, an input signal from another LAB 1002c or from an off-chip device via IO pad 1004g and routing architecture 1003, may apply a function to the input signal to generate an output signal, and provides the output signal via LAB output 1014d. The provision of the input signal may be based on a select input that may be selected via a configuration bit. The configuration bit is stored in a memory cell coupled to the select input. IO pad 1004*d* may receive the output signal output from LAB 1002*d* directly or via one or more switches 1006 and may send the output signal to an off-chip device.

In some embodiments, one or more LABs 1001 may be replaced by a RAM block, a digital signal processing (DSP) block, memory controller 108, or a buffer block. It is noted that in various embodiments, IC chip 1000 may include any number of LABs 1001, vertical LAB lines 1008, horizontal LAB lines 1010, switches 1006, and IO pads 1004.

It is noted that although some embodiments of the above-described systems and methods are described with respect to a PLD, in various embodiments, the systems and methods may apply to an ASIC. Moreover, although the systems and methods of various embodiments of the systems and methods may be described in the context of PLDs, it should be recognized that various systems and methods can apply to system on programmable chips (SOPCs), complex PLDs (CPLDs), and other integrated circuit devices.

Although the foregoing systems and methods have been described in detail by way of illustration and example for purposes of clarity and understanding, it will be recognized that the above described systems and methods may be embodied in numerous other variations and embodiments without departing from the spirit or essential characteristics of the systems and methods. Certain changes and modifications may be practiced, and it is understood that the systems and methods are not to be limited by the foregoing details, but rather is to be defined by the scope of the appended claims.

What is claimed is:

1. A memory controller comprising:
an interface for receiving user transactions;
an interface for communicating data with a memory device; and
logic for:
receiving a user transaction;
determining one or more memory commands based on the user transaction, the one or more determined memory commands including one or more row memory commands and/or one or more column memory commands, each row memory command being configured to cause access to a group of data cells associated with a particular row of the memory device, each column memory command being configured to cause access to a particular data cell of an accessed row of the memory device;
assigning each of the determined one or more memory commands to a respective pool slot in a memory command pool that includes a plurality of pool slots, the memory command pool also including one or more previously assigned memory commands in respective pool slots, the one or more previously assigned memory commands being associated with one or more previously received user transactions;
determining one or more command dependencies for one or more of the determined one or more memory commands, each determined command dependency indicating a dependency relationship between or among the respective determined memory command and one or more of the other memory commands in the memory command pool;
generating one or more bit vectors based on the determined one or more command dependencies, each bit vector being generated for a respective one of the determined one or more memory commands, each bit vector including a plurality of bits, each bit indicating whether the respective one of the determined one or more memory commands associated with the bit vector is dependent on an issuance of a respective one of the one or more other memory commands in the memory command pool associated with the bit or vice versa; and
reordering issuances of one or more of the determined one or more memory commands relative to one or more of the other memory commands to improve an efficiency of the communication of data between the logic and the memory device, the reordering being based on the one or more bit vectors to prevent the issuance of any memory command from the memory command pool prior to the issuance of all other ones of the memory commands in the memory command pool on which it depends.

2. The memory controller of claim 1, wherein the command dependencies are determined when the determined one or more memory commands are assigned to the memory command pool.

3. The memory controller of claim 1, wherein the logic is further for:
removing one or more of the memory commands from the memory pool when they are respectively issued; and
updating the bit vectors based on the removal.

4. The memory controller of claim 1, wherein the determined one or more memory commands are assigned to respective pool slots in the memory command pool without the use of predetermined or external identifiers.

5. The memory controller of claim 1, wherein:
the determined one or more memory commands include a first row memory command and a first column memory command;
the one or more generated bit vectors include a first bit vector and a second bit vector generated for the first row memory command and the first column memory command, respectively;
each bit in the first bit vector indicates a dependency between the first row memory command and a respective column memory command; and
each bit in the second bit vector indicates a dependency between the first column memory command and a respective column memory command.

6. The memory controller of claim 1, wherein each bit is assigned a first value or a second value, the first value indicating that the respective one of the determined one or more memory commands associated with the bit vector must be issued after the one of the one or more other memory commands associated with the respective bit, the second value indicating that the respective one of the determined one or more memory commands associated with the bit vector can be reordered relative to the one of the one or more other memory commands associated with the respective bit.

7. The memory controller of claim 1, wherein:
accessing a group of data cells associated with a particular row memory command includes activating or pre-charging the group of data cells; and
accessing a particular data cell associated with a particular column memory command includes writing data to, reading data from, or refreshing the particular data cell.

8. The memory controller of claim 1, wherein the reordering includes one or both of:
reordering one or more row memory commands to mitigate bus idle time; and
reordering one or more column memory commands to group together two or more column memory commands that are each configured to cause access to data cells within the same row of data cells in the memory device.

9. The memory controller of claim 2 wherein the logic is further for:

removing one or more of the memory commands from the memory pool when they are respectively issued; and
updating the bit vectors based on the removal.

10. A method comprising:
receiving a user transaction;
determining one or more memory commands based on the user transaction, the one or more determined memory commands including one or more row memory commands and/or one or more column memory commands, each row memory command being configured to cause access to a group of data cells associated with a particular row of a memory device, each column memory command being configured to cause access to a particular data cell of an accessed row of the memory device;
assigning each of the determined one or more memory commands to a respective pool slot in a memory command pool that includes a plurality of pool slots, the memory command pool also including one or more previously assigned memory commands in respective pool slots, the one or more previously assigned memory commands being associated with one or more previously received user transactions;
determining one or more command dependencies for one or more of the determined one or more memory commands, each determined command dependency indicating a dependency relationship between or among the respective determined memory command and one or more of the other memory commands in the memory command pool;
generating one or more bit vectors based on the determined one or more command dependencies, each bit vector being generated for a respective one of the determined one or more memory commands, each bit vector including a plurality of bits, each bit indicating whether the respective one of the determined one or more memory commands associated with the bit vector is dependent on an issuance of a respective one of the one or more other memory commands in the memory command pool associated with the bit or vice versa; and
reordering issuances of one or more of the determined one or more memory commands relative to one or more of the other memory commands to improve an efficiency of the communication of data to or from the memory device, the reordering being based on the one or more bit vectors to prevent the issuance of any memory command from the memory command pool prior to the issuance of all other ones of the memory commands in the memory command pool on which it depends.

11. The method of claim 10, wherein the command dependencies are determined when the determined one or more memory commands are assigned to the memory command pool.

12. The method of claim 10, further including:
removing one or more of the memory commands from the memory pool when they are respectively issued; and
updating the bit vectors based on the removal.

13. The method of claim 10, wherein the determined one or more memory commands are assigned to respective pool slots in the memory command pool without the use of predetermined or external identifiers.

14. The method of claim 10, wherein the determined one or more command dependencies include dependencies based on data hazards.

15. The method of claim 10, wherein the determined one or more command dependencies are based on reordering policies, control commands, and/or multicast commands.

16. The method of claim 10, wherein the determined one or more command dependencies comprise dependencies between row commands and column commands from a same user transaction.

17. The method of claim 10, wherein the determined one or more command dependencies depend on whether a row or column command associated with a first user transaction is dependent on a column command associated with a second user transaction.

18. The method of claim 10, wherein:
the determined one or more memory commands include a first row memory command and a first column memory command;
the one or more generated bit vectors include a first bit vector and a second bit vector generated for the first row memory command and the first column memory command, respectively;
each bit in the first bit vector indicates a dependency between the first row memory command and a respective column memory command; and
each bit in the second bit vector indicates a dependency between the first column memory command and a respective column memory command.

19. The method of claim 10, wherein each bit is assigned a first value or a second value, the first value indicating that the respective one of the determined one or more memory commands associated with the bit vector must be issued after the one of the one or more other memory commands associated with the respective bit, the second value indicating that the respective one of the determined one or more memory commands associated with the bit vector can be reordered relative to the one of the one or more other memory commands associated with the respective bit.

20. The method of claim 10, wherein:
accessing a group of data cells associated with a particular row memory command includes activating or pre-charging the group of data cells; and
accessing a particular data cell associated with a particular column memory command includes writing data to, reading data from, or refreshing the particular data cell.

21. The method of claim 10, wherein the reordering includes one or both of:
reordering one or more row memory commands to mitigate bus idle time; and
reordering one or more column memory commands to group together two or more column memory commands that are each configured to cause access to data cells within the same row of data cells in the memory device.

22. The method of claim 11, further including:
removing one or more of the memory commands from the memory pool when they are respectively issued; and
updating the bit vectors based on the removal.

23. A tangible computer-readable medium having non-transitory instructions stored thereon that, when executed by one or more processors, are configured to cause the one or more processors to perform operations comprising:
receiving a user transaction;
determining one or more memory commands based on the user transaction, the one or more determined memory commands including one or more row memory commands and/or one or more column memory commands, each row memory command being configured to cause access to a group of data cells associated with a particular row of a memory device, each column memory command being configured to cause access to a particular data cell of an accessed row of the memory device;

assigning each of the determined one or more memory commands to a respective pool slot in a memory command pool that includes a plurality of pool slots, the memory command pool also including one or more previously assigned memory commands in respective pool slots, the one or more previously assigned memory commands being associated with one or more previously received user transactions;

determining one or more command dependencies for one or more of the determined one or more memory commands, each determined command dependency indicating a dependency relationship between or among the respective determined memory command and one or more of the other memory commands in the memory command pool;

generating one or more bit vectors based on the determined one or more command dependencies, each bit vector being generated for a respective one of the determined one or more memory commands, each bit vector including a plurality of bits, each bit indicating whether the respective one of the determined one or more memory commands associated with the bit vector is dependent on an issuance of a respective one of the one or more other memory commands in the memory command pool associated with the bit or vice versa; and reordering issuances of one or more of the determined one or more memory commands relative to one or more of the other memory commands to improve an efficiency of the communication of data to or from the memory device, the reordering being based on the one or more bit vectors to prevent the issuance of any memory command from the memory command pool prior to the issuance of all other ones of the memory commands in the memory command pool on which it depends.

\* \* \* \* \*